United States Patent [19]

Schroeder et al.

[11] 4,266,432
[45] May 12, 1981

[54] GYRO MOTOR CONTROL

[75] Inventors: George F. Schroeder, Wayne; Walter J. Krupick, Succasunna, both of N.J.

[73] Assignee: The Singer Company, Little Falls, N.J.

[21] Appl. No.: 899,352

[22] Filed: Apr. 24, 1978

[51] Int. Cl.³ .................. G01C 19/10; G01C 19/28
[52] U.S. Cl. .................... 74/5.7; 74/5.6 E; 318/314; 318/318; 318/807
[58] Field of Search .................. 74/5.7, 5.4, 5.6 E; 318/807, 799, 310, 311, 329, 345 CB, 314, 318

[56] References Cited

U.S. PATENT DOCUMENTS

| 2,703,862 | 3/1955 | Gordon | 318/329 X |
|---|---|---|---|
| 2,880,616 | 4/1959 | Aumuller | 74/5.7 |
| 3,025,708 | 3/1962 | Slater et al. | 74/5.7 X |
| 3,044,309 | 7/1962 | Buchhold | 74/5.7 X |
| 3,262,324 | 7/1966 | Taylor | 74/5.7 X |
| 3,309,931 | 3/1967 | Adams et al. | 74/5.7 X |
| 3,377,872 | 4/1968 | Hodson et al. | 74/5.6 E |
| 3,543,114 | 11/1970 | Tadakuma et al. | 318/807 |
| 3,577,057 | 5/1971 | Dyer et al. | 318/329 X |
| 4,100,466 | 7/1978 | Schroeder | 318/807 X |
| 4,143,309 | 3/1979 | Patterson | 318/807 |

FOREIGN PATENT DOCUMENTS 807065  1/1959  United Kingdom .................. 74/5.7

Primary Examiner—Rodney H. Bonck
Attorney, Agent, or Firm—John C. Altmiller; T. W. Kennedy

[57] ABSTRACT

In order to eliminate the day-to-day gyro drift phenomena which result from interaction of the magnetic pole position of the synchronous motor typically used to drive the gyro and the gyro wheel, an induction motor controlled by a phase locked loop referenced to an appropriate control frequency is utilized to drive the gyro.

4 Claims, 5 Drawing Figures

4,266,432

GYRO MOTOR CONTROL

BACKGROUND OF THE INVENTION

This invention relates to gyroscopes in general and more particularly, to an improved motor drive system for precision gyroscopes.

It has been traditional to use synchronous motors controlled by an AC frequency to drive the gyro wheel in a precision gyroscope. Although this is basically a satisfactory method, various anomalous conditions relating to the interaction of the magnetic pole position of the synchronous motor and gyro wheel give rise to gyro drift phonomena which are difficult to eliminate. If left uncorrected, this gyro drift can lead to inaccuracies.

Thus, it becomes evident that a need exists to provide a better drive system for the gyro wheel in precision gyros which does not suffer from the aforementioned problems.

SUMMARY OF THE INVENTION

The present invention provides a system for driving the gyro wheel of a precision gyro which overcomes the difficulties encountered with the synchronous motor drive.

Basically, this is accomplished by using a nonsynchronous motor, e.g., an induction motor, to drive the wheel so that the rotating stator flux is decorrelated with respect to the gyro wheel. This thus eliminates a source of drift. In order to maintain the desired constant speed of the gyro wheel, the induction motor is driven and controlled by a closed servo loop, e.g., a phase locked loop, which is referenced to an appropriate control quantity, e.g., frequency or phase.

The control quantity is compared with a sensed actual value of the same quantity and an error developed which is used in the closed servo loop to bring the actual value into correspondence with the reference value. A sensor which can be a tachometer generator, pulse generator, shaft encoder, etc., is coupled to the motor. The control quantity can be, for example, speed, frequency, phase, or time between pulses, any of which will permit controlling the speed of the motor. In the illustrated embodiment a sensor is provided on the motor for sensing the rotor rotation speed and phase. This sensor, which provides an output pulse train, is coupled to the input of a phase detector having as a reference input the desired reference frequency of rotation. The phase detector determines the difference therebetween, and this difference is used to drive a voltage controlled oscillator. The output of the voltage controlled oscillator is coupled to a motor control which in turn acts to control bridges made up of solid state switches which switch a DC current with a two-phase wave form onto the motor stator windings. In this manner, a servo phase locked loop following the phase and frequency, of the reference is obtained.

Other types of servo loops can also be used in the present invention as can other types of motor controls. The disclosed embodiments is only an example of a system which has been found to give good results.

With this arrangement, it is possible to achieve accurate speed; eliminate synchronous electrical interaction between the stator, rotor and gyro wheel; and carry out a motor control which is simple and efficient with power derived from a DC source without the need for the conventional AC amplifiers normally used. Furthermore, the phase locked loop can be implemented with readily available integrated circuits and the control can be provided as auxiliary function of a mini computer or micro computer if one is used in conjunction with the gyro.

DETAILED DESCRIPTION OF THE INVENTION

Figure 1:
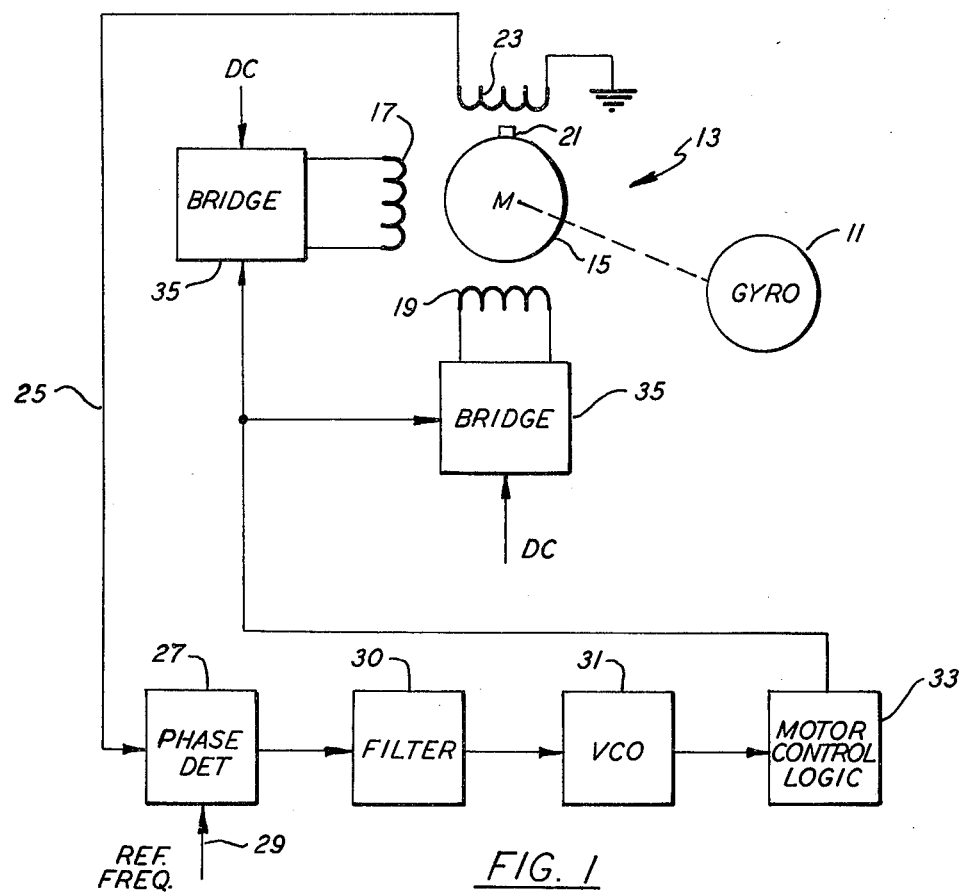
FIG. 1. is block diagram of the gyro motor control system of the present invention.

As shown by FIG. 1, the gyro wheel 11 in a precision gyro is driven by an induction motor 13. The induction motor 13, in conventional fashion, includes a rotor 15 and stator windings 17 and 19. In order to detect the rotor position, an auxiliary magnet 21 is installed on the motor. The passing of the magnet is picked up by a coil 23, which provides a signal on line 25 in the form of a pulse train, the rate of which indicates the rotational speed of the rotor and the phase of which indicates the rotor angular position. Although implemented as a magnetic pickup, other types of pickups, such as photoelectric, Hall effect, etc., can be used for this purpose.

The pulses on line 25 are fed as one input to a phase detector 27. The second input of the phase detector is a reference frequency which is related to the desired motor speed, as will be more fully explained below. In well known fashion, the phase detector generates a signal proportional to the phase error between the reference frequency pulses on line 29 and the pulses from the motor on line 25. This error signal feeds a voltage controlled oscillator 31 through a filter 30. The output of oscillator 31 is the input to a motor controller 33, which provides control signals to bridges 35 which are used to couple DC power into the windings 17 and 19. The frequency supplied to the bridges and thus to the windings will be the frequency of the voltage controlled oscillator 31 (possibly divided down as will be seen below). The oscillator frequency is adjusted a small amount up and down until the pickoff frequency of the output on line 25 matches that of the frequency of the reference on line 29. A phase difference will normally exist to maintain a voltage at the input to oscillator 31 which will result in the desired frequency. Alternatively, filter 30 can be an integrator in which case the phase error can be brought to zero. In general, filter 30 will be selected to give the type of servo performance desired in a given situation using conventional servo design techniques.

Figure 2:
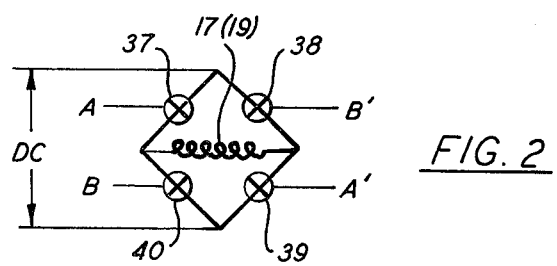
FIG. 2 is a circuit diagram of the bridges utilized in the control of FIG. 1.

The bridges utilized for supplying the windings 17 and 19 are as shown on FIG. 2. Each bridge comprises four solid state switches, the switches being labelled 37 through 40. Switch 37 has an input labelled A, switch 38 an input labelled B', switch 39 an input labelled A', and switch 40 an input labelled B. The winding 17 or 19 is coupled across one diagonal of the bridge and a DC voltage across the other diagonal of the bridge. For the winding 17, the switches A and A' are closed when the phase of the voltage out of voltage controlled oscillator is 0°. They open at 180°. For the winding 17, switches B and B' are closed between 180° and 0°. The bridge 35 associated with the winding 19 has its switches A and A' closed between 90° and 270°, and the switches B and B' closed between 270° and 90°. This is shown on FIG. 3a which will be described below.

Figure 3:
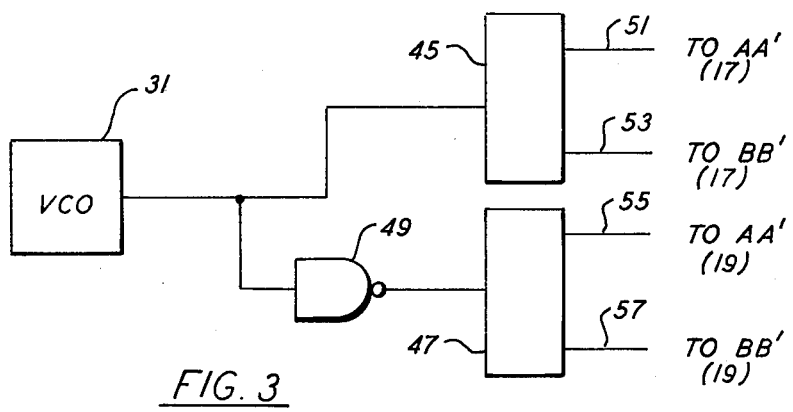
FIG. 3 is a logic diagram of the motor control logic of FIG. 1.
Figure 3A:
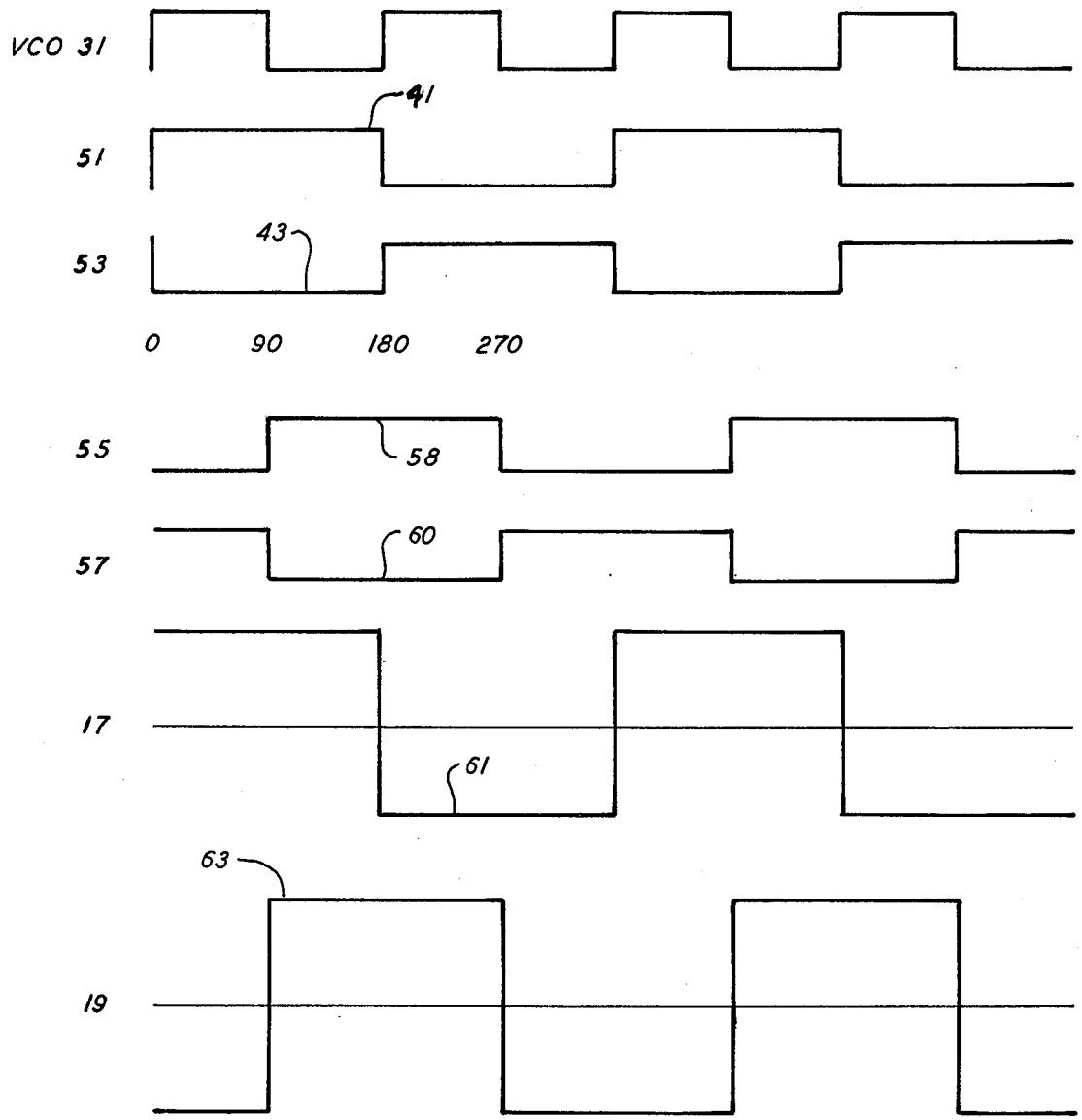
FIG. 3a is a timing diagram for the logic of FIG. 3 and bridges of FIG. 2.

As illustrated in FIG. 3, which shows the motor control logic, the voltage controlled oscillator frequency is coupled through a first flip-flop 45 to divide it in half. The two signals developed at the outputs 51 and 53 of flip-flop 45 are the signals 41 and 43 of FIG. 3a. The signal from oscillator 31 is also inverted in an inverter 49. This signal is the input to another flip-flop 47. Its outputs on lines 55 and 57 are the signals 58 and 60 of FIG. 3a. As shown, the output 51 drives the switches A and A' associated with winding 17. Output 53 drives the switches B and B' associated with winding 17. Output 55 drives the switches A and A' associated with winding 19 and ouput 57 the switches B and B' associated with winding 19. The resulting wave forms at the windings are designated on FIG. 3a as 61 and 63.

In operation, the pulse rate on the line 25 is proportional to the rotor speed. As the motor rotates the phase of these pulses is compared in the phase comparator 27 with the reference phase on line 29 to generate an error signal which is fed to the voltage controlled oscillator 31. The voltage controlled oscillator 31 developes an output frequency which, if everything else is correct, will be twice that of the rotation frequency of the motor. This frequency is then divided in half in the manner indicated through the flip-flops 45 and 47 of FIG. 3 to develop the two-phase signals of FIG. 3a.

Figure 4:
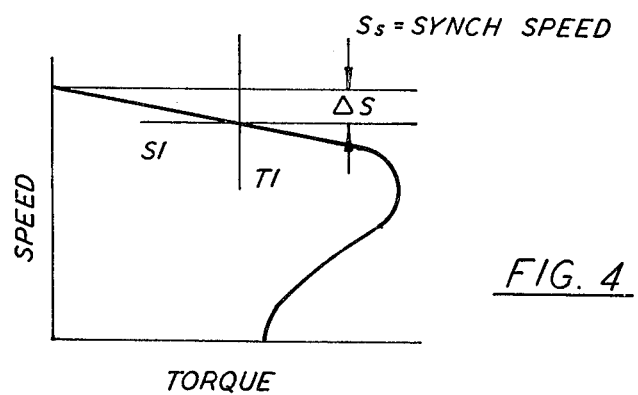
FIG. 4 is a torque-speed curve for an induction motor helpful in understanding the manner in which the present invention operates.

FIG. 4 illustrates a typical induction motor speed-torque curve. Assuming that the total motor load torque is $T_1$ and the motor is running at speed $S_1$, the conditions shown on the figure will exist. The theoretical maximum motor speed of the rotor is related to the excitation frequency, this speed being called the synchronous speed. When loaded, the rotor has a certain amount of slip designated $\Delta S$. Thus, as shown on the figure, synchronous speed is equal to the speed $S_1$ plus $\Delta S$. Assume that in response to an increased error at the voltage controlled oscillator input, the oscillator increases its frequency. This increases the excitation frequency of the motor and will cause the synchronous speed to increase. The effect of an increase in synchronous speed is an increase in the slip $\Delta S$. It is evident from the curve that this will cause the motor to develop more torque and begin to accelerate. As the motor accelerates, it regains the proper speed and the error drops off so that the excitation frequency out of the voltage controlled oscillator also drops off. Similarly, the reverse is true. That is, if the motor speeds up too much, an error change in the opposite direction causes the excitation frequency to decrease. A decrease in the synchronous speed and a deceleration coupled therewith bring the motor back to the desired speed. Thus, the motor is coupled in a phase locked servo loop and will accurately maintain the desired speed at all times. The only thing one must watch in designing the system is that the range of $\Delta S$ be chosen so as not to go past the knee of the torque-speed curve, since it is necessary that with an increase in synchronous speed there be increasing torque and with a decrease there be decreasing torque. Going below the knee of the curve would result in the opposite behavior and an unstable system.

What is claimed is:

1. In a precision gyroscope, an improved drive system for the gyro wheel comprising:
   (a) an induction motor having first and second stator windings and a rotor, said rotor mechanically coupled to the gyro wheel;
   (b) a magnet on said rotor and sensing coil means on said stator to provide sensing means with a pulse train output having a frequency proportional to the rotational speed of said rotor with the pulses of said pulse train having a phase related to the phase of said motor within a given cycle of rotation;
   (c) means to supply a reference frequency;
   (d) a phase detector having as inputs the detected phase of said rotor and said reference frequency and providing an output representing the phase error therebetween;
   (e) a voltage controlled oscillator having said phase error coupled thereto as an input and developing an output related thereto; and
   (f) motor control means coupled to said voltage controlled oscillator for developing two-phase signals for energizing said first and second windings comprising:
      (i) first and second bridges, each bridge comprised of four solid state switches in a bridge configuration, a respective first or second winding coupled across one diagonal of said bridge and a DC voltage across the other diagonal of said bridge; and
      (ii) means for developing from said voltage controlled oscillator output two signals shifted 90° in phase and at the desired operating frequency for driving the switches of said bridges.

2. Apparatus according to claim 1 and further including filter means between said phase comparator and voltage controlled oscillator.

3. In a precision gyroscope, an improved drive system for the gyro wheel comprising:
   (a) an induction motor having first and second stator windings and a rotor, said rotor mechanically coupled to the gyro wheel;
   (b) means to sense the frequency of rotation and phase of the rotor;
   (c) means to supply a reference frequency;
   (d) a phase detector having as inputs the detected phase of said rotor and said reference frequency and providing an output representing the phase error therebetween;
   (e) a voltage controlled oscillator having said phase error coupled thereto as an input and developing an output related thereto; and
   (f) motor control means coupled to said voltage controlled oscillator for developing two-phase signals for energizing said first and second windings comprising:
      (i) first and second bridges, each bridge comprised of four solid state switches in a bridge configuration, a respective first or second winding coupled across one diagonal of said bridge and a DC voltage across the other diagonal of said bridge; and
      (ii) means for developing from said voltage controlled oscillator output two signals shifted 90° in phase and at the desired operating frequency for driving the switches of said bridges.

4. Apparatus according to claim 3 and further including filter means between said phase comparator and voltage controlled oscillator.